(12) United States Patent
Yamamoto et al.

(10) Patent No.: US 9,843,177 B2
(45) Date of Patent: Dec. 12, 2017

(54) PROTECTION TUBE WITH LATCH AND MANUFACTURING APPARATUS FOR THE SAME

(71) Applicant: YAZAKI CORPORATION, Minato-ku, Tokyo (JP)

(72) Inventors: Masataka Yamamoto, Kosai (JP); Takehiko Uehara, Kosai (JP); Yoshihiro Murakami, Kosai (JP); Masahiro Sora, Toyota (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 14/042,067

(22) Filed: Sep. 30, 2013

(65) Prior Publication Data
US 2014/0027147 A1    Jan. 30, 2014

Related U.S. Application Data

(63) Continuation-in-part of application No. PCT/JP2012/058553, filed on Mar. 30, 2012.

(30) Foreign Application Priority Data

Apr. 1, 2011 (JP) .................................. 2011-082010

(51) Int. Cl.
*H02G 3/04* (2006.01)
*H02G 3/32* (2006.01)
(Continued)

(52) U.S. Cl.
CPC ........... *H02G 3/04* (2013.01); *B60R 16/0215* (2013.01); *H02G 3/0406* (2013.01);
(Continued)

(58) Field of Classification Search
CPC .. H02G 3/30; H02G 3/32; H02G 3/34; H02G 3/04; H02G 3/0406; H02G 3/36;
(Continued)

(56) References Cited

U.S. PATENT DOCUMENTS 2,998,217 A * 8/1961 Englis .................. F16L 3/1008
248/222.52
3,711,633 A * 1/1973 Ghirardi .................. H02G 3/06
174/135
(Continued)

FOREIGN PATENT DOCUMENTS

CN        201146350 Y    11/2008
JP        55-90429        6/1980
(Continued)

OTHER PUBLICATIONS

Communication dated Mar. 3, 2015 from the European Patent Office in counterpart European Application No. 12767586.6.
(Continued)

*Primary Examiner* — Dimary Lopez Cruz
(74) *Attorney, Agent, or Firm* — Sughrue Mion, PLLC

(57) ABSTRACT

Provided is a protection tube with latch in which a latch that is formed engageable with an attachment hole of a panel is molded integral with a protection tube that receives an electric wire, and a manufacturing apparatus of the protection tube with latch. The protection tube with latch includes a latch to be engaged with the attachment hole of the panel having the electric wire wired therein disposed on an outer peripheral face of the protection tube that is formed tubular and receives the electric wire.

7 Claims, 14 Drawing Sheets

(51) Int. Cl.
*B60R 16/02* (2006.01)
*H02G 3/00* (2006.01)

(52) U.S. Cl.
CPC .............. *H02G 3/0462* (2013.01); *H02G 3/32* (2013.01); *H02G 3/263* (2013.01)

(58) Field of Classification Search
CPC .......... H02G 3/0468; H02G 3/24; H02G 3/26; H02G 3/0481; H02G 3/0462; H02G 3/045; F16B 21/086; F16L 3/00; F16L 3/02; F16L 3/04; F16L 3/06; F16L 3/10; F16L 3/12; F16L 3/08; F16L 3/26; F16L 3/23; F16L 3/13; F16L 11/122; B60R 16/0215
USPC .............. 138/121; 174/68.3, 72 A, 135, 154; 248/71, 55, 68.1, 73–74.5
See application file for complete search history.

(56) References Cited

U.S. PATENT DOCUMENTS

| | | | |
|---|---|---|---|
| 4,303,221 A | 12/1981 | Gallusser et al. | |
| 4,784,358 A * | 11/1988 | Kohut | F16L 3/137 24/16 PB |
| 4,997,148 A * | 3/1991 | Sherman | F16L 3/10 24/279 |
| 5,316,245 A * | 5/1994 | Ruckwardt | 248/68.1 |
| 5,873,550 A * | 2/1999 | Phillips | F16L 3/1075 248/73 |
| 5,962,814 A * | 10/1999 | Skipworth | B60R 16/0215 174/135 |
| 6,087,593 A * | 7/2000 | Skipworth | B60R 16/0215 174/135 |
| 6,287,501 B1 | 9/2001 | Rowley | |
| 6,491,067 B1 * | 12/2002 | Davenport et al. | 138/110 |
| 6,595,473 B2 * | 7/2003 | Aoki | B60R 16/0215 138/108 |
| 6,613,981 B1 * | 9/2003 | Hathcock et al. | 174/69 |
| 6,644,892 B2 * | 11/2003 | Nishiwaki et al. | 405/184.4 |
| 6,669,150 B2 * | 12/2003 | Benoit et al. | 248/74.2 |
| 6,789,301 B1 | 9/2004 | Luke et al. | |
| 6,875,918 B2 * | 4/2005 | Sudo | H02G 3/06 138/108 |
| 7,185,680 B2 | 3/2007 | Magno, Jr. et al. | |
| 7,441,732 B2 * | 10/2008 | Ferragut | B60R 16/0222 248/606 |
| 7,523,898 B1 * | 4/2009 | Barry et al. | 248/71 |
| 8,020,812 B2 * | 9/2011 | Matsuno | F16L 3/1075 24/336 |
| 8,124,887 B2 * | 2/2012 | Suzuki | B60R 16/0215 174/481 |
| 8,129,621 B2 * | 3/2012 | Mizutani | B60R 16/0215 174/135 |
| 2014/0027147 A1 | 1/2014 | Yamamoto et al. | |

FOREIGN PATENT DOCUMENTS

| | | |
|---|---|---|
| JP | 6062823 U | 5/1985 |
| JP | 6069529 U | 5/1985 |
| JP | 61-161913 A | 7/1986 |
| JP | 1-96725 U | 6/1989 |
| JP | 08-058752 A | 3/1996 |
| JP | 11167834 A | 6/1999 |
| JP | 11-205943 A | 7/1999 |
| JP | 2002-315164 A | 10/2002 |
| JP | 2005-026178 A | 1/2005 |
| JP | 2006-014569 A | 1/2006 |
| JP | 2007-026988 A | 2/2007 |
| JP | 2007-529321 A | 10/2007 |
| JP | 2009-171648 A | 7/2009 |
| JP | 201229407 A | 2/2012 |

OTHER PUBLICATIONS

Communication dated Oct. 10, 2015 from The State Intellectual Property Office of People's Republic of China in counterpart application No. 201280017497.7.
Communication dated Nov. 10, 2015 from the Japanese Patent Office in counterpart application No. 2011-082010.
Office Action from the Mexican Institute of Industrial Property, dated Aug. 22, 2016 in counterpart Mexican Patent Application No. MX/a/2013/011031.
Communication dated Mar. 21, 2016, from the Intellectual Property Office of Indonesia in counterpart application No. W00201304649.
Communication dated Dec. 19, 2016 from the United States Patent and Trademark Office in counterpart U.S. Appl. No. 14/730,722.
Communication dated Apr. 17, 2017 issued by the United States Patent and Trademark Office in counterpart U.S. Appl. No. 14/730,648.

* cited by examiner

PROTECTION TUBE WITH LATCH AND MANUFACTURING APPARATUS FOR THE SAME

TECHNICAL FIELD

This invention relates to protection tubes with latch in which latches formed to be engaged with holes of panels are molded integral with protection tubes that accommodate electric wires, and manufacturing apparatuses of the protection tubes with latch.

BACKGROUND ART

On automobiles and the like are mounted various electric devices and electric components. As means for transmitting to these electric devises and the electric components electric power from power source or control signals from control devices are employed wire harnesses.

The wire harnesses are wired on the panels composing car bodies of the automobiles or the like. There have been advocated various types of wire harnesses that are provided with wiring clips engaged with attachment holes of the panels (see PTLs 1 to 3).

The above-mentioned wire harness is provided with a protection tube as an exterior component for preventing the electric wire from damage, which results from interference of the panel and the wire harness when wired in the panel (for example, PTL 4). The protection tube has a latch attached thereto to bind an outside of the protection tube and to be engaged with a latch hole of the panel.

The latch is provided with a belt binding outside of the protection tube and a latch formed operable to be engaged with the latch hole, and is bound to the protection tube with a given tension by a binding tool (for example, PTL 5).

The binding tool is provided with a fastening structure fastening the belt of the latch, a lever operating manually the fastening structure, and a cutting structure cutting the belt fastened by the fastening structure (for example, PTL 6).

The above-mentioned wire harness is configured such that a binder tool which holds and branches the electric wire and a latch attachment tool which attaches the latch to the protection tube upstand therefrom, and that the electric wire is wired in two-dimensional plane on a wiring board in order to be wired in three-dimensional space above the panel in a predetermined wiring formation by using the wiring board indicating wiring path for wiring the electric wire in predetermined formation (for example, PTL 7).

The latch attachment tool is provided with a base fixed onto the wiring board with bolt or the like, a columnar part upstanding from the base, a receiving part disposed at a tip of the columnar part and receiving the latch of the latch tool, and a guide parallel to the receiving part and guiding the belt of the latch (for example, PTL 8).

CITATION LIST

Patent Literature

[PTL 1]
Japanese Patent Application Laid-Open Publication No. 2002-315164
[PTL 2]
Japanese Patent Application Laid-Open Publication No. 2005-26178
[PTL 3]
Japanese Patent Application Laid-Open Publication No. 2006-14569
[PTL 4]
Japanese Patent Application Laid-Open Publication No. H11-205943
[PTL 5]
Japanese Patent Application Laid-Open Publication No. 2009-171648
[PTL 6]
Japanese Patent Application Laid-Open Publication No. 2007-529321
[PTL 7]
Japanese Patent Application Laid-Open Publication No. 2007-26988
[PTL 8]
Japanese Patent Application Laid-Open Publication No. H8-58752

SUMMARY OF INVENTION

Technical Problem

Disadvantageously, in the above-mentioned protection tube a part bound by the band of the latch is collapsed, and the electric wire is thus bitten at the collapsed part in the protection tube. Furthermore, in the part where the protection is collapsed, a space receiving the electric wire is reduced and a gap in a space of the received electric wire lacks, degrading electric wire protection feature for the protection tube. Furthermore, a part where the protection tube is collapsed is where the electric wire and the protection tube are bound together with the band of the latch, and thus experiences a heavy load of oscillation and the like exerted on the electric wire. The part where the protection tube is collapsed is in part bitten by the electric wire. It does not look good as well because the protection tube is collapsed.

Furthermore, since the latch in the above-mentioned protection tube is bound together with the protection tube using the binding tool, a space is required for operator to operate the binding tool to work. Thereby the above-mentioned wiring board becomes upsized because working space is secured in order to keep workability.

Where the electric wire is branched into the plural on the wiring board, electric wire is arranged at intervals enough to keep its working space for the binding tool, and thus flexibility for form of wiring the electric wire becomes reduced. Besides reduction of the flexibility for form of wiring the electric wire, changing a direction of the latching tool or the electric wire to a direction in which the working space for the binding tool is secured may make the electric wire twisted when the electric wire is wired on the panel.

Furthermore, the above-mentioned latching attachment tool, because of its provision of various types of mechanisms for attaching the latching tool to the electric wire, becomes complicated and large-sized. Thereby, it is necessary to secure large space for fixing space to fix the latch attachment tool to the wiring board.

Furthermore, when using a protector but not the above-mentioned protection tube, the protector for which a die is each made every application and installation lacks versatility and becomes expensive. There is, however, when using the protection tube which is versatile and inexpensive, the above drawbacks posed.

An object of this invention is to resolve concerned problems. Namely, the present invention is intended to provide a protection tube with latch integrally molded to a protection tube in which a latch formed operable to be engaged with a attachment hole of a panel accommodates an electric wire, and a manufacturing apparatus of the protection tube with latch.

Solution to Problem

In order to resolve the problems and achieve the object, the invention of one aspect is related to a protection tube with latch in which a latch to be engaged with a attachment hole of a panel on which an electric wire is wired is formed tubular and is provided on an outer peripheral face of the protection tube accommodating the electric wire.

Preferably, the invention is related to a manufacturing apparatus of the protection tube with latch provided with a die including a protection tube cavity accommodating the protection tube, a latch cavity formed to communicate the protection tube cavity and follow an outline of the latch, a shaft passed through the protection tube received in the protection tube cavity of the die.

Preferably, the shaft is provided with a projection strip projecting from an outer peripheral of the shaft and extending in axis direction of the shaft.

Preferably, on an inner peripheral face of the protection tube is disposed a circular projection strip formed along an outline of the protection tube and abutting onto the outer peripheral face.

Advantageous Effects of Invention

According to the invention related to the one aspect, since the protection tube with latch need not be closely bound to the protection tube, and the latch is integrally molded to protection tube, the protection tube is not subject to collapsing. Thereby, the protection tube exercises its inherent feature of protection for electric wire. Therefore, there are resolved conventional various types of drawbacks that are induced by the protection tube collapsing such as the electric wire is bitten by the protection tube, load such as oscillation that is exerted on the electric wire increases, and attractiveness is reduced.

Furthermore, since the protection tube with latch is not required to be closely bound to the protection tube by the latch, it is made possible to downsize the wiring board because of omission of the space to work the binding tool. Utilization of the space to work the binding tool as wiring space for the electric wire also allows flexibility of the wiring types of the electric wire on two dimensional plane on the wiring board to increase. Broadening of working space for wiring on the wiring board allows to perform wiring in a direction securing workability of the biding tool without altering the direction of the attachment tool or the electric wire. Thereby, the wire harness with the protection tube with latch, when wired in three dimensional space of the panel, restricts the electric wire thereof from twist.

Furthermore, the protection tube with latch does not need the conventional attachment tool with large and complicated structure, and thus a small and simple one can be used. Therefore, wiring space on the wiring board becomes enlarged.

Protection tube of versatile products such as marketed products can be applied to the protection tube with latch, which can more readily correspond to various types of automobiles or panels than conventional protectors that are dedicated products. Therefore, it is made possible to provide cost-favorably the protection tube with latch.

According to the invention, since the shaft passed through the protection tube allows reduction of deformation of the protection tube caused by injection pressure of melt resin forming the latch, the manufacturing apparatus of the protection tube with latch manufactures, keeping inherent shape and protection function thereof, the protection tube with latch.

According to the invention, since onto the protection tube having a slit through which the electric wire axially across its whole length is passed, the latch in which a slit continuously communicating across the whole length with the slit is molded, the manufacturing apparatus of the protection tube with latch makes the protection tube with latch having the slit formed therein.

According to the invention, since the melt resin injected into the latch cavity is stemmed by the circular projection strip in the manufacturing apparatus of the protection tube with latch, the melt resin is prevented from intruding into where the latch is not formed. Therefore, it is prevented that the melt resin intrudes from the latch cavity into the protection tube cavity and that the protection tube with latch becomes defective, reducing defective rate for the protection tube with latch 1.

DESCRIPTION OF EMBODIMENTS

Hereinafter with reference now to FIGS. 1 to 25 embodiments are described.

Figure 1:
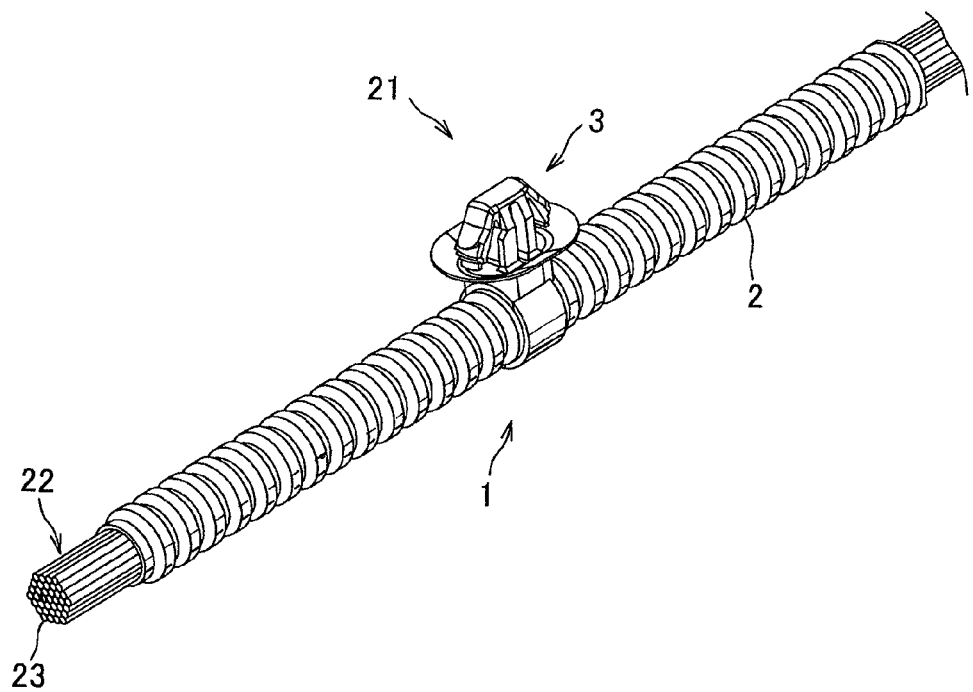
FIG. 1 is a perspective view illustrating a wire harness including a protection tube with latch according to one embodiment of the invention.

A wire harness 21 with a protection tube with latch 1 according to a first embodiment of the present invention, as shown in FIG. 1, includes a electric wire buddle 22 accommodated within the protection tube with latch 1, to be wired in a panel. The wire harness bundle 22 is formed such that a plurality of electric wires 23 is bundled and wound by not-shown adhesive tape such as tape for wire harness.

The electric wire 23 is provided with a conductive core wire and a insulating cover. The core wire is formed such that a plurality of conductors are braided. The conductors are made of conductive metal such as copper or copper alloy. The cover is made of polyvinyl chloride or polyethylene resin as non-halogen resin composition and so on, is disposed on outer circumferential face of the core wire, and covers the core wire. Thereby, the outer face of the electric wire 23 becomes an outer face of the cover. Note that the core wire may be made of a single conductor.

Figure 2:
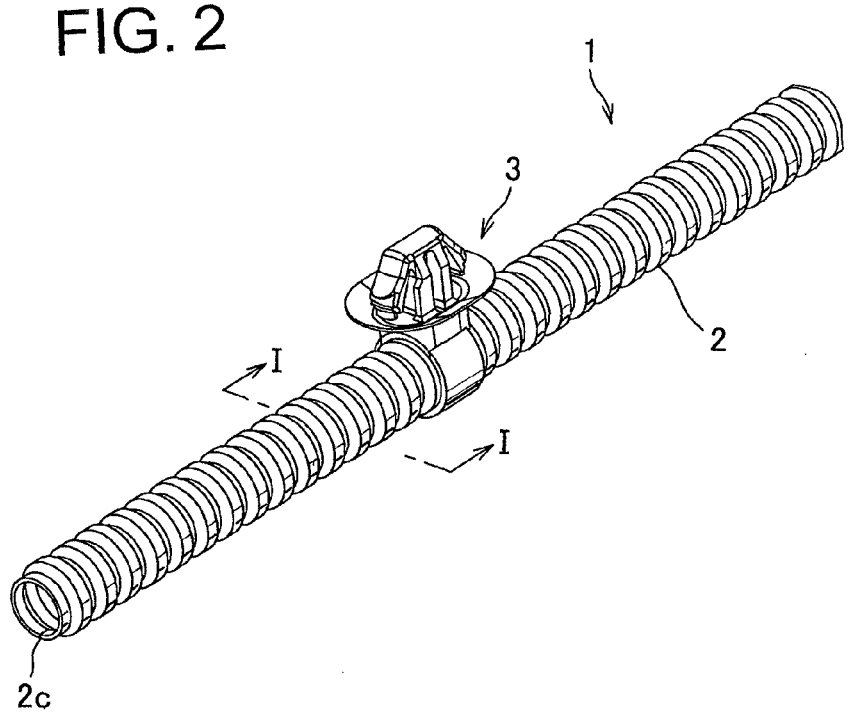
FIG. 2 is a perspective view illustrating the protection tube with latch shown in FIG. 1.

The protection tube with latch 1, as shown in FIG. 2, is provided with a protection tube 2 accommodating therewithin the electric wire 22 and preventing the electric wire bundle 22 from contacting the panel and the various types of devices and from being damaged, and a latch 3 formed operable to be engaged with an attachment hole opened in the panel.

Figure 6:
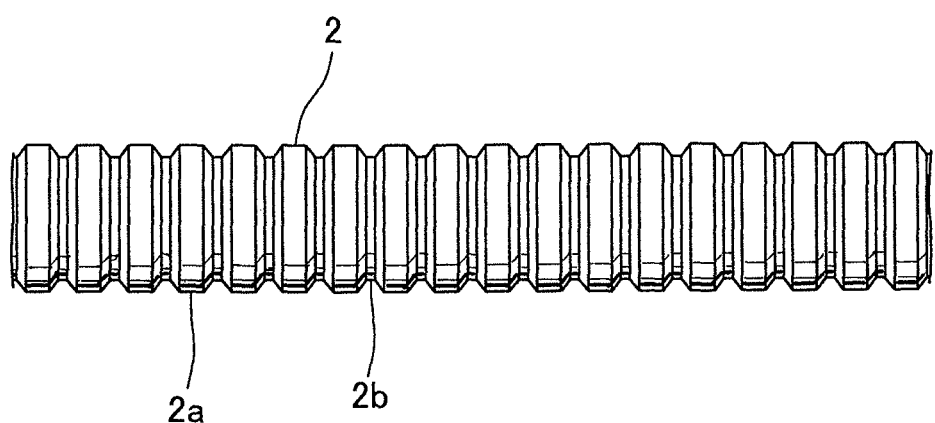
FIG. 6 is a side view illustrating the protection tube with latch shown in FIG. 2.

The protection tube 2, as shown in FIGS. 2 and 6, is what is called a corrugated tube arranged such that a ridge 2a and a groove 2b are alternately repeatedly arranged in an axial direction of the protection tube 2. The protection tube 2, as shown in FIG. 2, is provided with a slit 2c across its whole length. Thereby, via the slit 2c the electric wire bundle 22 is accommodated in the protection tube 2. The protection tube 2 is made of synthetic resin such as nylon resin that is non-halogen resin composition not using fluorine, chlorine or bromic fire-retardant, which conforms to fire-retardant of V-0 grade in the UL 94 standards.

Figure 3:
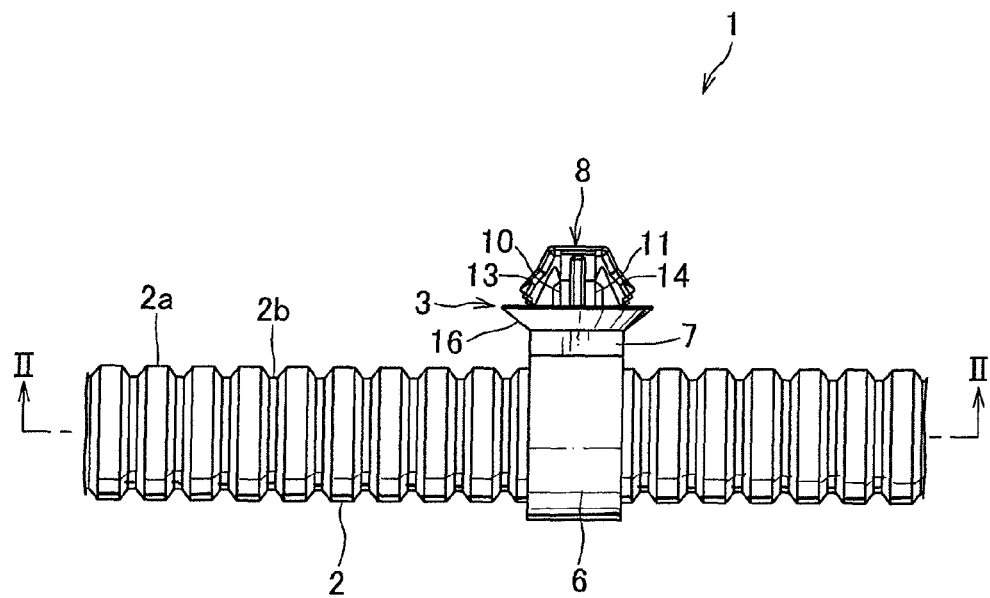
FIG. 3 is a side view illustrating the protection tube with latch shown in FIG. 2.
Figure 4:
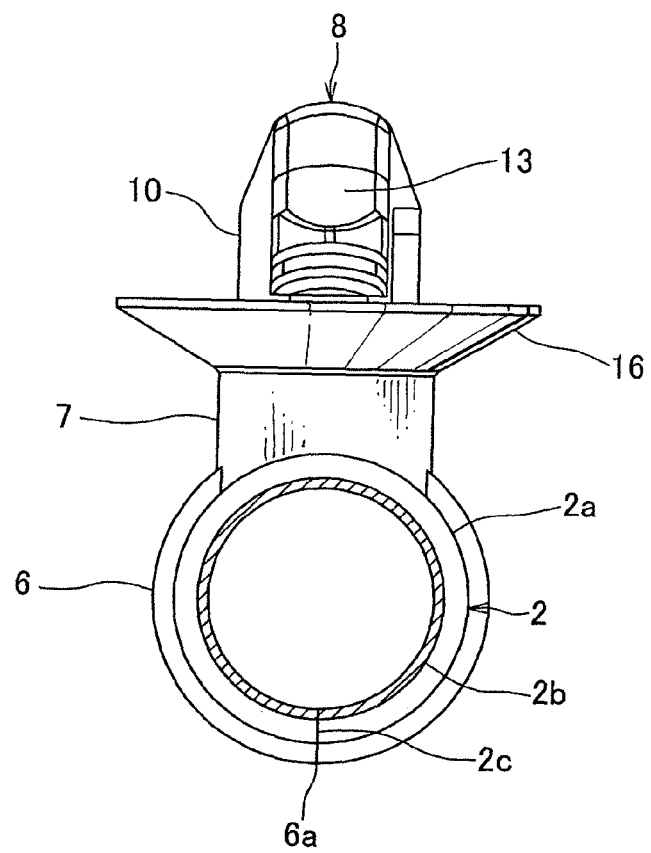
FIG. 4 is a cross-sectional view illustrating the protection tube with latch shown in FIG. 2 taken from arrow I-I.

The latch 3, as shown in FIGS. 3 and 4, is provided with a tubular part 6 disposed on the outer peripheral face of the protection tube and formed tubular, a main body 7 upstanding on the tubular part 6, a latch 8 upstanding at a tip of the main part 7, and press part 16 enlarging from the tip of the main body 7 its diameter. The latch 3 is integrally molded of synthetic resin such as nylon resin that is non-halogen resin composition having the same fire-retardant as the protection tube 2 and elasticity as well.

Figure 5:
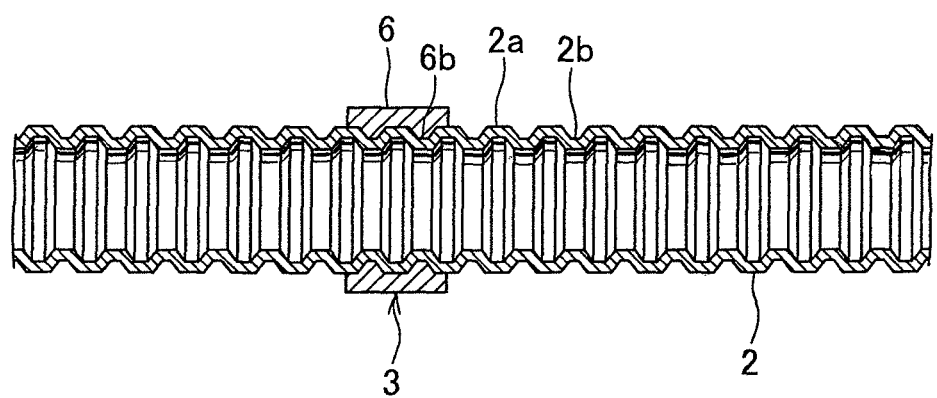
FIG. 5 is a cross-sectional view illustrating the protection tube with latch shown in FIG. 3 taken from arrow II-II.

The tubular part 6, as shown in FIGS. 4 and 5, is provided with a slit 6a disposed on the outer peripheral face of the protection tube 2 and continuously communicating with the slit 2c. On an inner peripheral face of the tubular part 6 is disposed a plurality of ring-like projecting strip 6b fitted in the groove 2b of the protection tube 2.

The main body 7, as shown in FIGS. 3 and 4, upstands on the tubular part 6. The main body 7 is formed narrower than the outer diameter of the ridge 2a of the protection tube 2, and is formed across its whole length in the axis direction of the protection tube 2 on the tubular part 6 as well.

The latch part 8, as shown in FIGS. 3 and 4, is provided with columnar parts 10, 11 upstanding from the main body 7, and latch pieces 13, 14 extending from the tip of the columnar parts 10, 11 toward the main body 7. The columnar parts 10, 11 are adjacently arranged in parallel. The latch pieces 13, 14 are gradually separated toward main body 7 from tips of the columnar parts 10, 11 and formed movable in a direction parallel to an axis of the protection tube 2. Note that the latch part 8 is formed in a such fashion not only as what is called a center impeller that includes latch pieces 13, 14 but as what is called a cantilever that includes the one of latch pieces 13.

A press part 16 is formed into taper-like shape such that its diameter is enlarged from a peripheral edge of the tip of the main body 7 toward the tip of the columnar parts 10, 11. The press part 16 is formed to have some elasticity that presses a surface of the panel when the latch part 8 is engaged with the attachment hole of the panel.

The protection tube with latch 1 configured as mentioned above as shown in FIG. 8 is made with a manufacturing apparatus 31 for the protection tube with latch 1.

Figure 8:
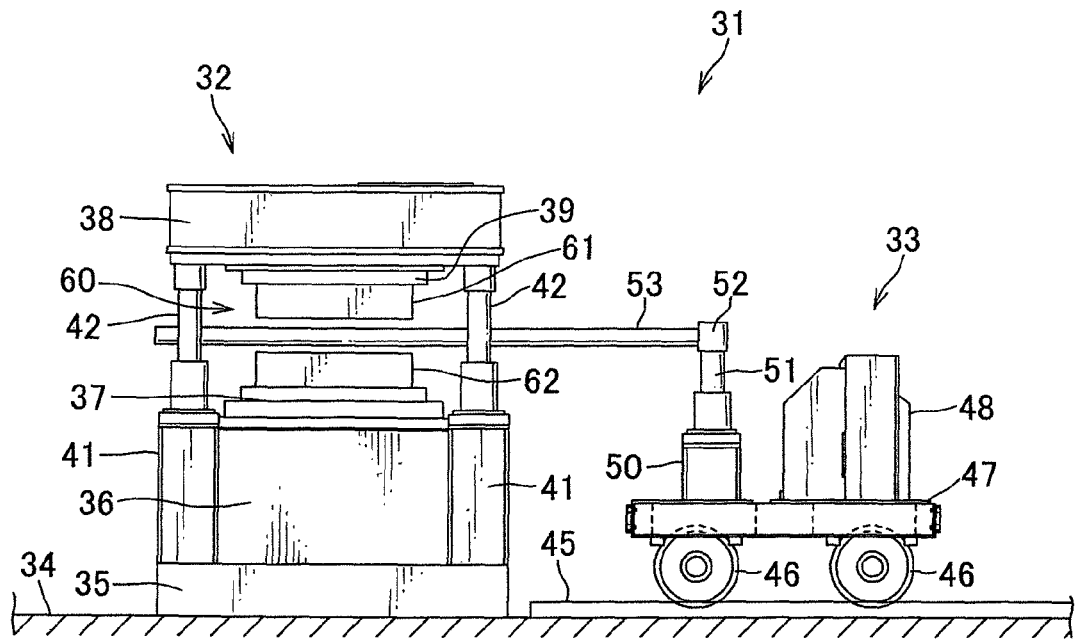
FIG. 8 is a schematic diagram illustrating a manufacturing apparatus for the protection tube with latch shown in FIG. 2.

The manufacturing apparatus 31 as shown in FIG. 8 is provided with a injection molding device 32 molding the latch part 3 on outer peripheral face of the protection tube 2, and a positioning device 33 adjusting molding position of the latch part 3 to be molded on the peripheral face of the protection tube 2. The injection molding device 32 and the positioning device 33 are set on a floor 34 of a factory line manufacturing the wire harness 21. The manufacturing apparatus 31 is automatically controlled by a computer sending and receiving such control signals with each of the injection molding device 32 and the positioning device 33. It follows from this that an operator can operate by oneself a plurality of manufacturing apparatuses 31.

The injection molding device 32, as shown in FIG. 8, is provided with a not-shown injection device injecting melting resin, a table 35 set on the floor 34, a base 36 fixed onto the table 35, holding plate 37 held on the base 36, a lower die 62 as a die 60 held on the holding plate 37, hydraulic devices 41, 41 fixed to the holding plate 37 and arranged around the base 36, hydraulic cylinders 42, 42 reciprocated by the hydraulic devices 41, 41, a beam 38 bridging over the hydraulic cylinders 42, 42, a holding plate 39 fixed to lower face of the beam 38, and an upper die 61 as the die 60 fixed to the holding plate 39. The injection molding device 32 includes a control device that controls the injection device and the hydraulic device and is automatically controlled by input and output signals from the computer.

The melting resin is made of synthetic resin such as nylon resin having fire-retardancy of V-0 of the UL 94 standards not using fluorinated resin, chlorinated resin, or brominated fire-retardant. Material of the melting resin may be used in a form of hollow pellet or granular pellet, or only inexpensive granular pellet.

The hydraulic devices 41, 41 are provided with operating oil, an oil rank in which the operating oil is charged, a hydraulic pump exerting pressure to the operating oil, an electric motor driving the hydraulic pump, a hydraulic circuit introducing the operating oil pressured by the hydraulic pump, and a diversion valve switching flow channel of the operating oil in the hydraulic circuit.

The hydraulic cylinders 42, 42 are provided with a cylinder tube communicating with the hydraulic circuit, and a cylinder rod slidably disposed in the cylinder tube and reciprocated by the operating oil introduced in the cylinder tube.

Figure 7:
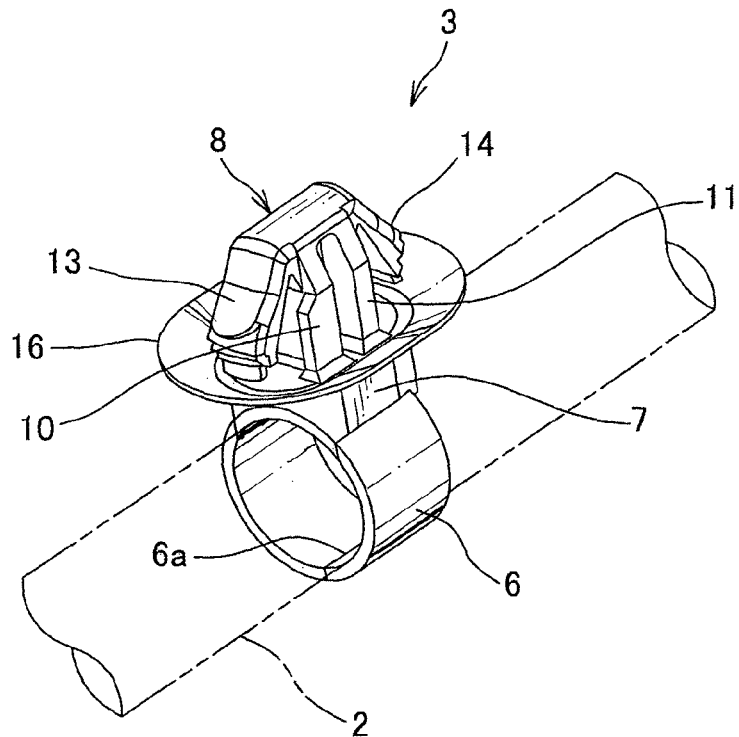
FIG. 7 is a perspective view illustrating the protection tube with latch shown in FIG. 2.

The die 60, as shown in FIG. 8, is provided with an upper die 61 as a movable type and a lower die 62 as a fixed type. The die 60, as shown in FIG. 7, is provided with a protection tube cavity 63 formed into circular shape along an outer diameter of the ridge 2a of the protection tube 2 and receiving the protection tube 2, a latch cavity 64 formed along an outline of the latch 3, and weirs 65, 66 disposed in the protection tube 63 and disposed at both sides across the latch cavity 64.

Figure 10:
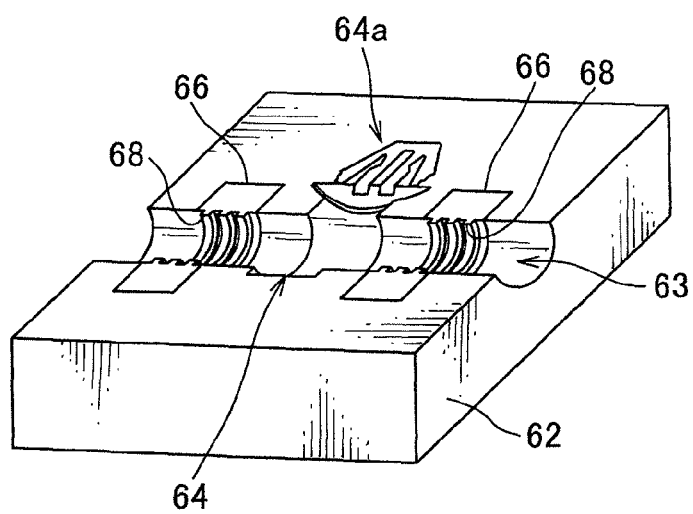
FIG. 10 is a perspective view illustrating a lower die of the die shown in FIG. 9.

In the latch cavity 64 as shown in FIG. 10, the die 60 provided with the latch cavity 64a that forms the latch part 8 of the latch 3, as shown in FIG. 8, has the upper die 61 moved vertically by mold crimping mechanism that is composed by the hydraulic device 41, the hydraulic cylinders 42, 42, and the beam 38, and allows the die 60 to open and close and to be mold-crimped.

Note that the die 60 may allow a plurality of protection tube cavities 63 to line in parallel in the die 60, the latch 3 to be at the same time molded in the plurality of protection tubes with the same diameter, or the latch 3 to be molded in the plurality of protection tubes with different diameter. Furthermore, the die 60 may allow a plurality of latch cavities 64 to be disposed in the protection tube cavity 63 and the plurality of latches 3 to be at the same time molded onto the single protection tube 2.

Note that in the die 60 in the case of coinstantaneously molding the latch 3 in the plural onto the single protection tube 2, the plurality of latch cavities 64, when the protection tube with latch 1 is attached to the panel, is arranged where the plurality of latches 3 can be engaged with attachment hole of the panel. Namely the plurality of latch 3 is disposed where its position relative to the protection tube 2 is arranged so as to be engaged with the attachment hole of the panel.

By that the plurality of latches 3 is arranged where its position relative to the protection tube 2 is arranged so as to be engaged with the attachment hole of the panel, which is set forth in the invention, is meant that in the protection tube with latch 1 obtained by injection-molding melting resin into the latch cavity 64 that is held in the relative position when designed, of the protection tube with latch 1 to the protection tube cavity 63, relative position to the protection tube 2 of the plurality of latches 3 except error induced upon molding is kept in the predetermined position determined in designing.

Figure 9:
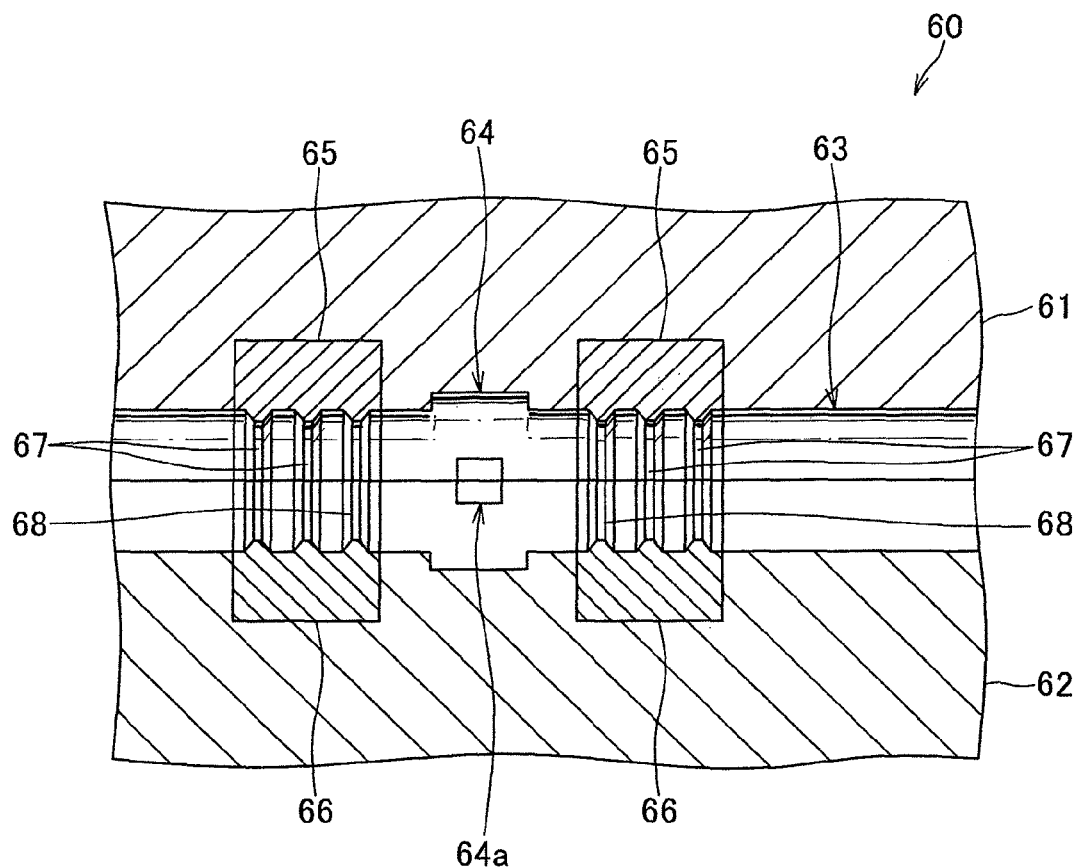
FIG. 9 is cross-sectional view illustrating a main section of a die of injection molding device of the manufacturing apparatus shown in FIG. 8.

The weirs 65, 66, as shown in FIGS. 6, 9 and 10, is formed into half-circle shape abutting onto the ridges 2a and the grooves 2b that are disposed repeatedly and alternately on the outer peripheral face of the protection tube 2. The weirs 65, 66, as shown in FIG. 9, is disposed in the upper die 61. The weirs 65, 66, as shown in FIG. 10, is disposed in the lower die 62. The weirs 65, 66 have a plurality of arc-like projections 67, 68 disposed stemming intrusion of the melting resin into the protection tube cavity 63.

The arc-like projections 67, 68, as shown in FIGS. 9 and 10, are formed into half-circle shape along an outline of the groove 2b of the outer peripheral face of the protection tube 2. The arc-like projections 67, 68 are arranged parallelly in the plural so as to abut onto the groove 2b adjacent to the protection tube 2.

The positioning device 33 is provided with a rail 45 fixed to the floor 45, a wheel 46 rotating on the rail 45, a body 47 supporting pivotally an axis in which the wheel 46 is disposed, a drive device 48 mounted to the body 47 that drives and stops the wheel 47, a not-shown linear position detector detecting running position of the body 47, a not-shown controller controlling the drive device 48 based on a position data detected by the linear position detector, a hydraulic device 50 mounted to the body 47, a hydraulic cylinder 51 reciprocated by the hydraulic device 50, a holder 52 disposed at a tip of the hydraulic cylinder 51, and a shaft 53 supported by the holder 52 and extending horizontally toward the injection-molding device 32. Note that while the positioning device 33 may include a sliding structure capable of moving in parallel the shaft 53, a structure including the body 47 is shown for example.

The drive device 48 is provided with an electric motor driven by a not-shown external power source, a decelerating mechanism transporting rotation of an axis of the electric motor to the wheel 46, and a control mechanism controlling the wheel 46.

The linear position detector is provided with a strip-like scale disposed along the rail, and a detector detecting data on the strip-like detector disposed in the body 47. As the linear position detector is used what is called a linear scale such as a magnetic scale, a transparent photoelectric scale, a reflective photoelectric scale, a laser holography scale, or an electromagnetic guided scale.

The control device is provided with an arithmetic circuit comparing positioning data detected by the linear position detector and predetermined positioning data inputted by the computer, an inverter controlling the electric motor of the drive device 48 based on a result determined by the arithmetic circuit, a transceiver transmitting and receiving such control signals from the computer.

The hydraulic device 50 is provided with operating oil, oil tank in which the operating oil is accumulated, hydraulic pump exerting pressure to the operating oil, an electric motor driving the hydraulic pump, a hydraulic circuit introducing the operating oil to which pressure is exerted by the hydraulic pump, and a diversion valve switching flow channel of the operating oil in the hydraulic circuit.

The hydraulic cylinder 51 is provided with a cylinder tube communicating with the hydraulic circuit, and a cylinder rod slidably disposed in the cylinder tube and reciprocated by the operating oil introduced in the cylinder tube.

The holder 52 is formed such that a plurality of shafts 53 with different diameter is formed detachable. The holder 52 is provided with a abutting face at a fixing part where the shaft 53 is fixed, which abuts one end of the protection tube 2 onto which the shaft 5 is fitted.

Figure 11:
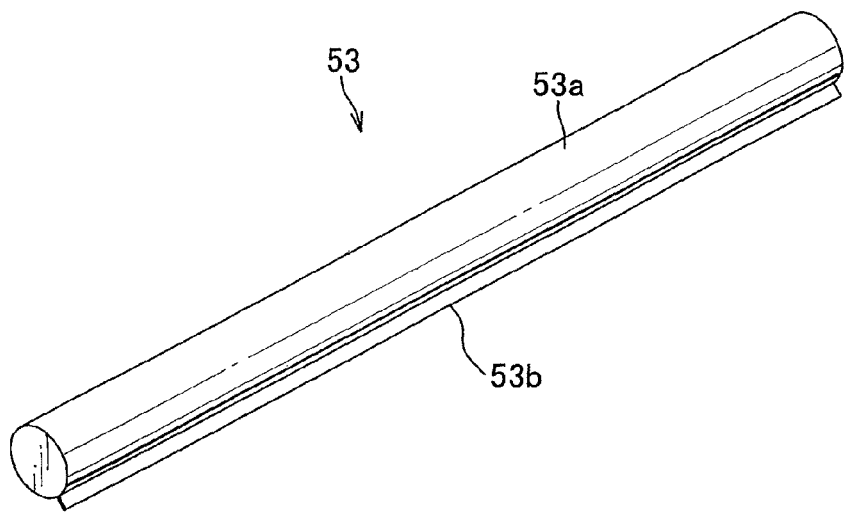
FIG. 11 is a perspective view illustrating a shaft of the positioning tool of the manufacturing apparatus shown in FIG. 8.

The shaft 53, as shown in FIG. 11, is provided with a columnar part 53a extending horizontally and straightly from the holder 52 and formed into columnar shape, and a projecting strip 53b projecting on an outer peripheral face of the columnar part 53a and extending in an axial direction of the columnar part 53a. The columnar part 53a is formed such that its diameter is made smaller than an inner diameter of the recess 2b of the protection tube 2. The projecting strip 53b is formed across whole length of the columnar part 53a and projects further than the sum of thicknesses of the protection tube 2 passing through the columnar part 53a and the tubular part 6 of the latch 3 formed on the outer peripheral face of the protection tube 2.

The shaft 53 is arranged such that its outer diameter lies within 4 to 12 mm, and four types of shafts 53 with its outer diameter of 4 mm, 8 mm, 10 mm and 12 mm, respectively, are prepared. The shafts 53 are each formed detachable to the holder 52, and arranged detachable corresponding to a size of the protection tube 2 on which the latch 3 is formed.

A method of manufacturing the above-mentioned protection tube with latch 1 using the manufacturing apparatus 31 configured as mentioned above is discussed with reference to FIGS. 12 to 19.

Figure 12:
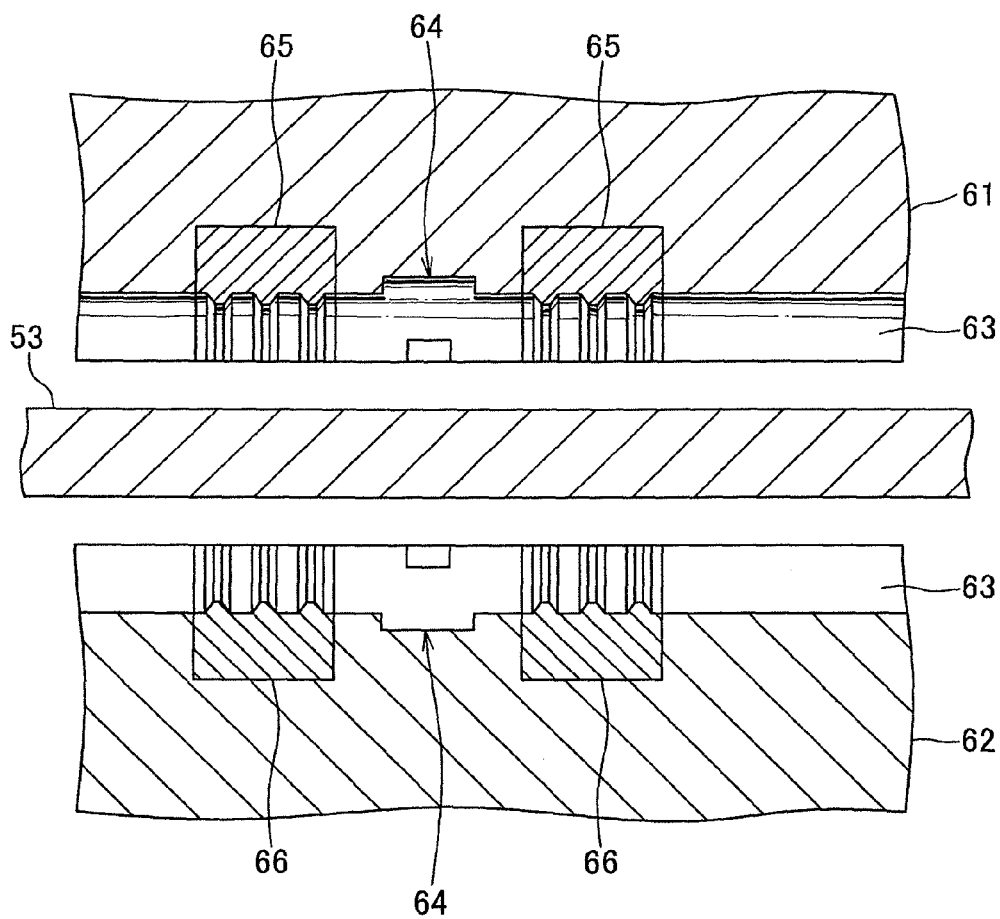
FIG. 12 is a cross-sectional view illustrating a main section of the die and the shaft at initial state of manufacturing apparatus shown in FIG. 8.

First, as shown in FIGS. 8 and 12, the upper die 61 and the lower die 62 are disengaged to disconnect the die 60, and in the protection tube cavities 63, 63 disposed in the upper die 61 and the lower die 62 the shaft 53 is arranged.

Figure 13:
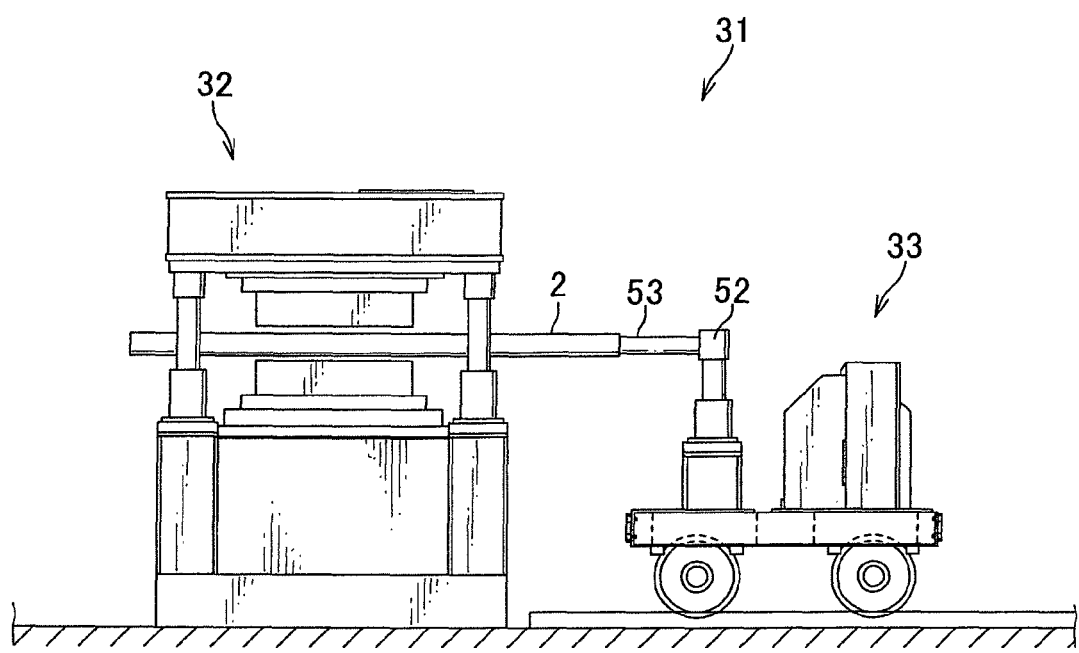
FIG. 13 is a schematic view illustrating a state in which the protection tube is arranged in the manufacturing apparatus shown in FIG. 8.
Figure 14:
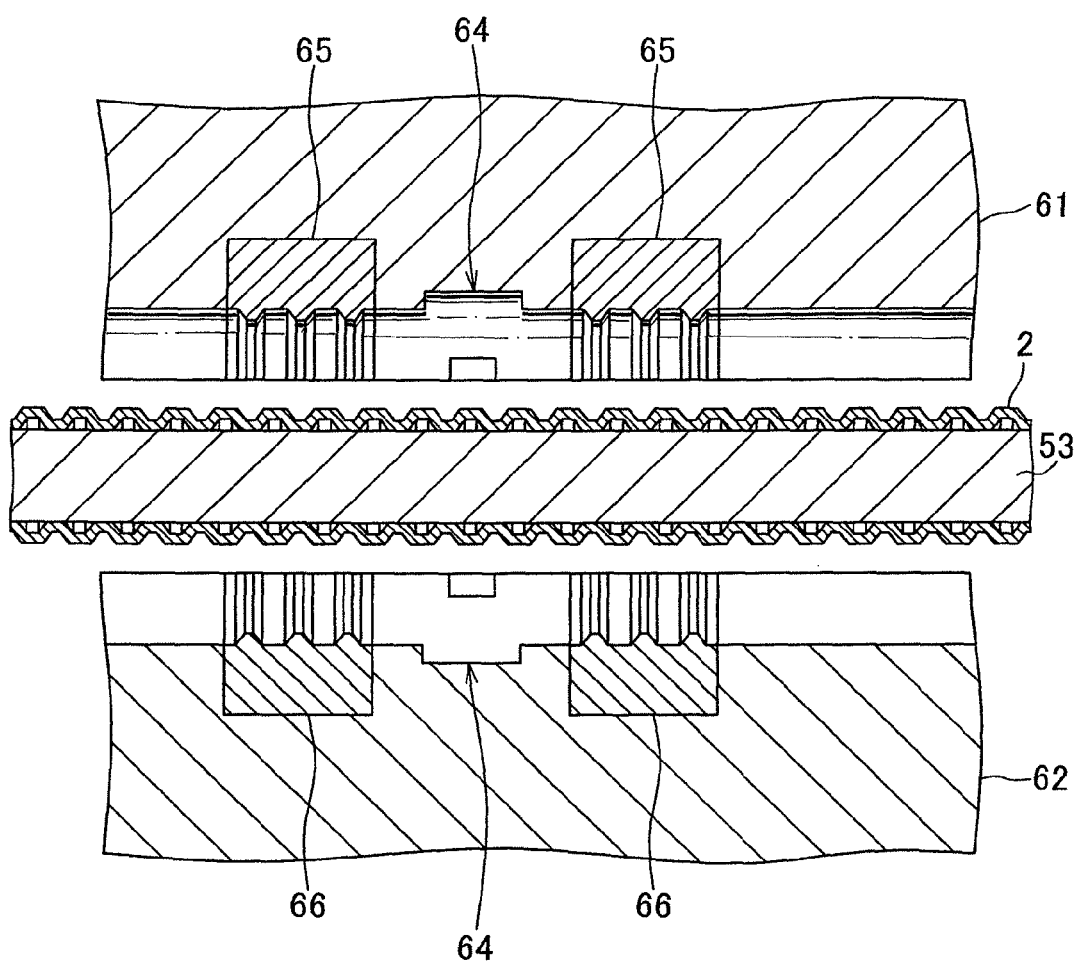
FIG. 14 is a cross-sectional view illustrating a main section of the die, the shaft, and the protection tube of the manufacturing apparatus shown in FIG. 13.
Figure 15:
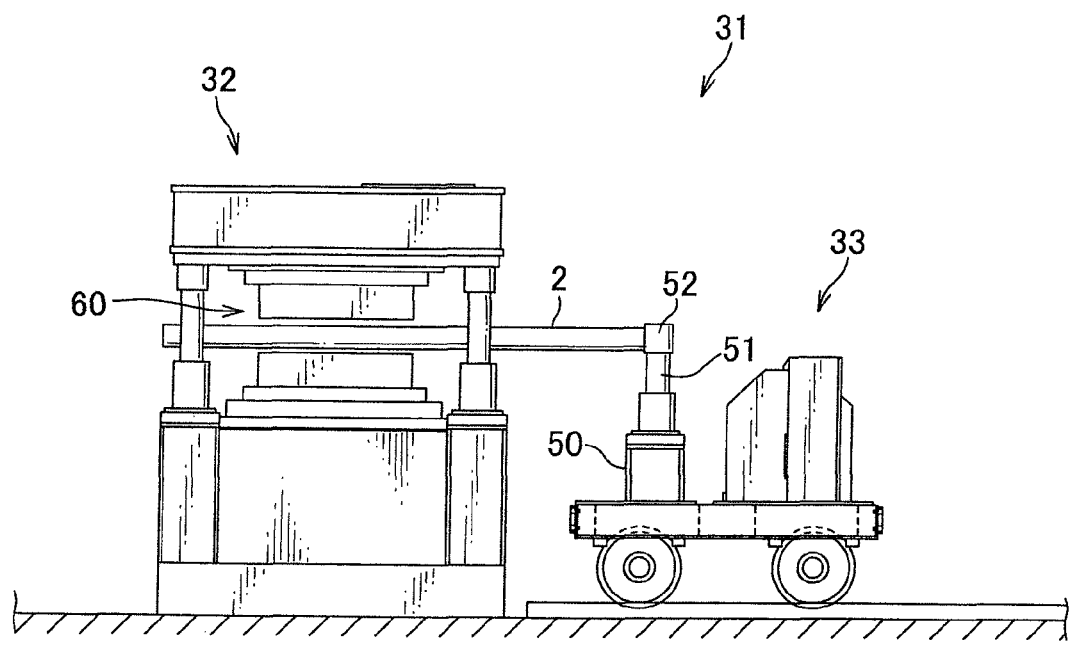
FIG. 15 is a schematic view illustrating a state in which the protection tube in the manufacturing apparatus is positioned shown in FIG. 13.

Then, as shown in FIGS. 13 and 14, the protection tube 2 is fitted onto the shaft 53, and as long as the one end of the protection tube 2 abuts onto the holder 52 the protection tube 2 is pressed toward the holder 52. At this time as shown in FIG. 14, the outer peripheral face of the shaft 53 and the inner peripheral face of the recess 2b of the protection tube 2 abut onto each other. Note that as the protection tube 2 is used the one with its whole length within 300 mm.

Then, as shown in FIG. 5, at a predetermined position where the latch 3 is formed on the outer peripheral face of the protection tube 2 the positioning device 33 is moved, and thus the protection tube 2 is positioned. At this time the positioning device 33 determines a position of the body 47 using the linear position device, and moves the predetermined position preliminary inputted in the computer. Note that operator, while visually confirming position, may move manually the positioning device 33. A position where the latch 3 is formed on the protection tube 2 lies axially within 80 mm to 150 mm from the end of the protection tube.

Figure 16:
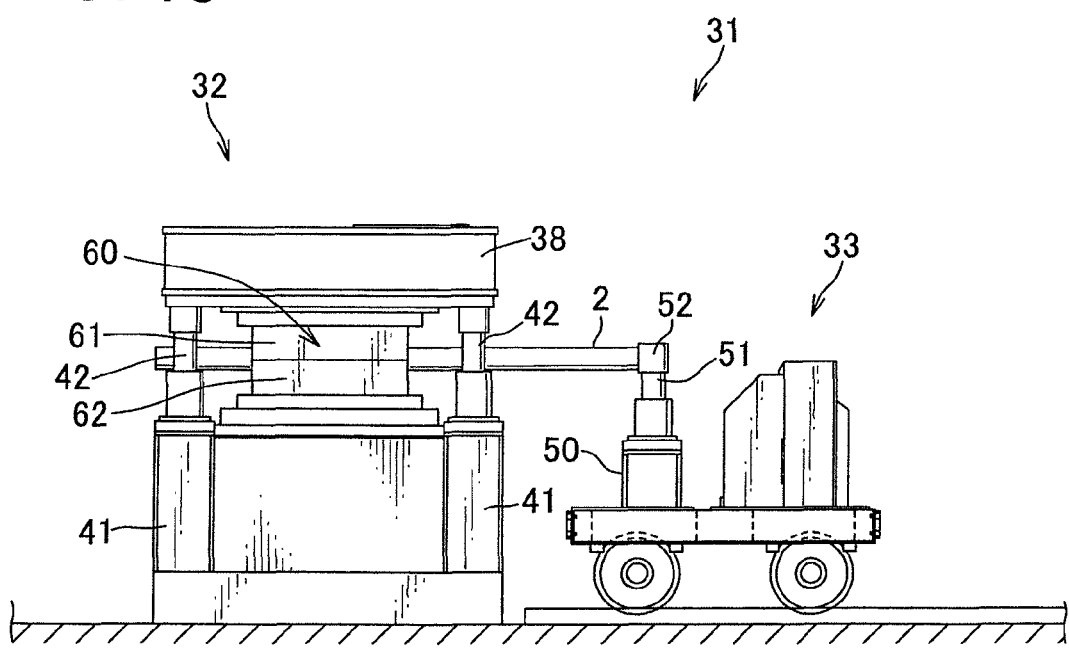
FIG. 16 is a schematic view illustrating a state in which the die of the manufacturing apparatus is closed shown in FIG. 15.
Figure 17:
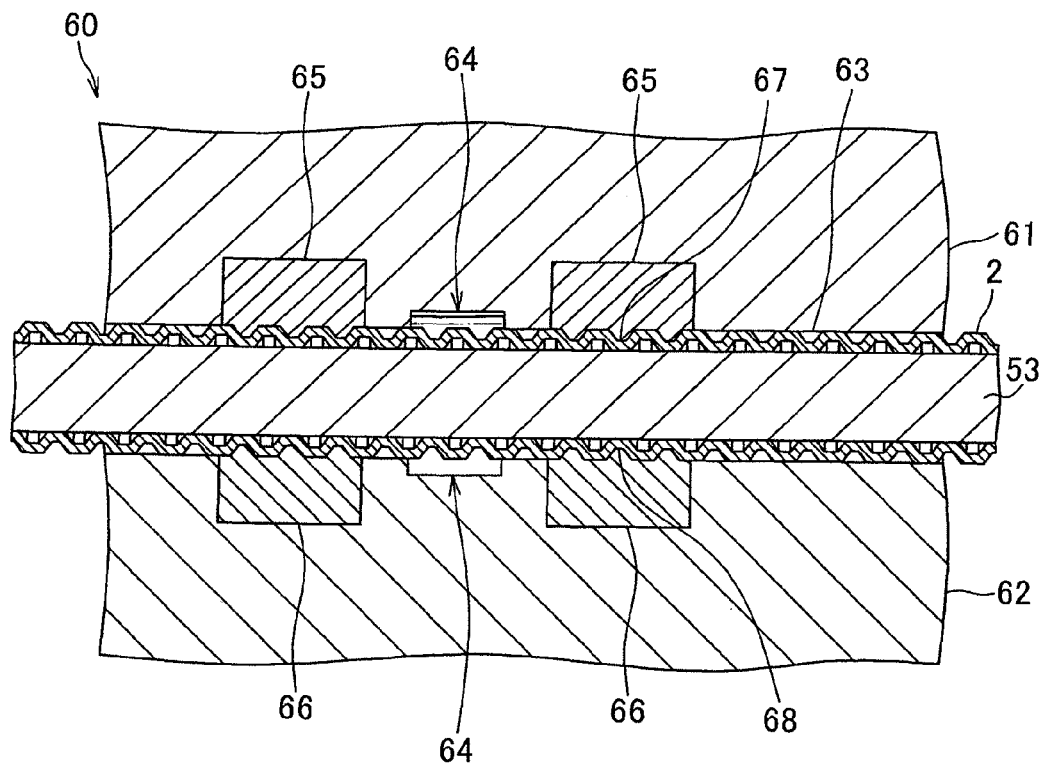
FIG. 17 is a cross-sectional view illustrating a main section of the die, the shaft, and the protection tube of the manufacturing apparatus shown in FIG. 16.

Then, as shown in FIGS. 16 and 17, by the mold clamping mechanism composed of the hydraulic devices 41, 41, the hydraulic cylinders 42, 42, and the beam 38, the upper die 61 is descended, and thus the die 60 is closed and mold-clamped. At this time as shown in FIG. 17, the outer peripheral face of the ridge 2a of the protection tube 2 abuts onto the inner peripheral face of the protection tube cavity 63 of the die 60 and the weirs 65, 66, the outer peripheral face of the groove 2b of the protection tube 2 abuts onto the arc-like projection strips 67, 68 of the weirs 65, 66 as well, and the inner peripheral face of the groove 2b of the protection tube 2 abuts onto the outer peripheral face of the shaft 53. It follows from this that the ridge 2a and the groove 2b of the protection tube 2 can be prevented from deformation by pressure of the melting resin injected into the latch cavity 64, and the melting resin can be prevented from intruding into the protection tube cavity 63.

Then, from a not-shown injection device melting resin is injected into the die 60, and the latch cavity 64 is infilled with the melting resin. At this time the melting resin is heated within a temperature at which the protection tube 2 does not experience plastic deformation.

Figure 18:
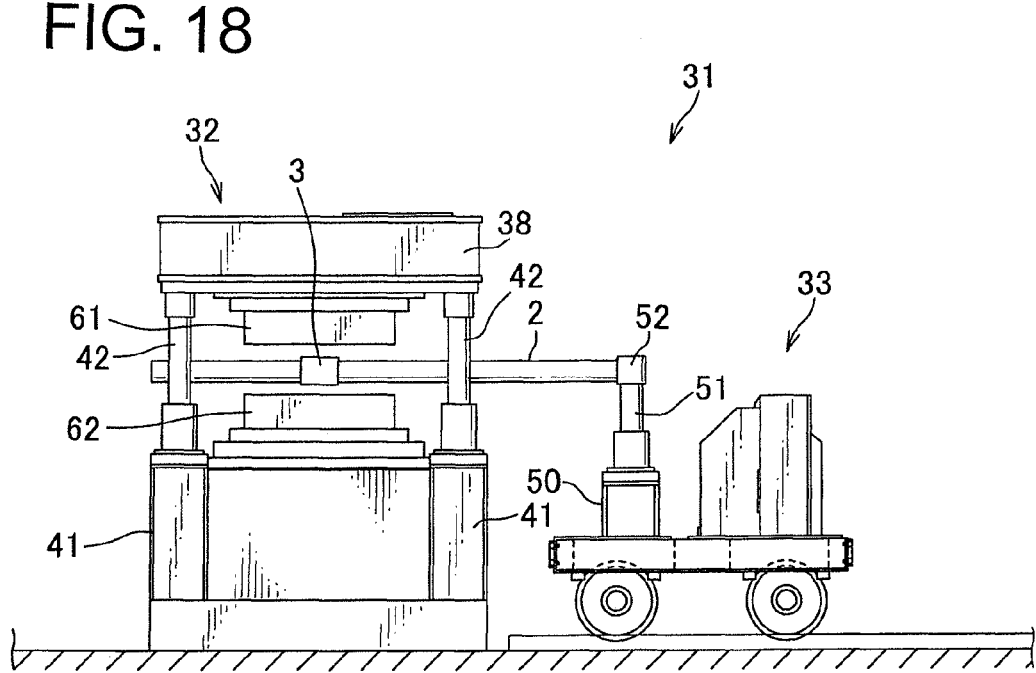
FIG. 18 is a schematic view illustrating a state in which the die is disconnected of the manufacturing apparatus shown in FIG. 15.
Figure 19:
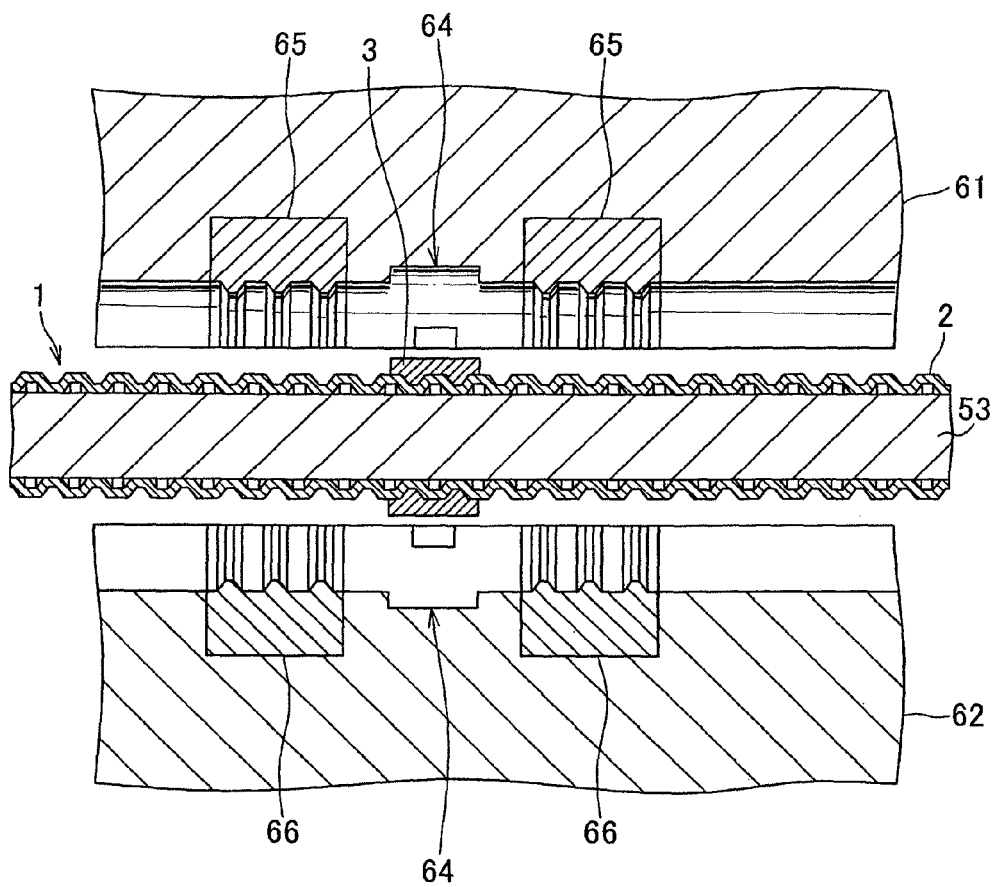
FIG. 19 is a cross-sectional view illustrating a main section of the die, the shaft, and the protection tube of the manufacturing apparatus shown in FIG. 18.

Then, as shown in FIGS. 18 and 19, when the resin infilled in the latch cavity 64 becomes cured, the upper die 61 is moved upward and the die 60 is opened, the hydraulic cylinder 51 is extended upwardly by the hydraulic device 50 of the positioning device 33, and the protection tube 2 is ejected from the lower die 62. At this time the protection tube with latch is formed in which the latch 3 is molded on the outer peripheral face of the protection tube 2.

Then, the protection tube with latch 1 is removed out of the shaft 53, and the protection tube with latch 1 is completed. After that, repeating the manufacturing process mentioned above, the protection tube with latch 1 is made.

In the protection tube with latch 1 manufactured using the above-mentioned manufacturing apparatus 31, the electric wire bundle 22 wired on the wiring board is inserted into the slit 6b of the latch 3 and the slit 2c of the protection tube 2, the electric wire bundle 22 is received in the protection tube 2, and not-shown various external components are mounted to the electric wire bundle 22 so as to complete the wire harness 21.

The wire harness 21 is ejected from the wiring board, and is wired in a required form in such the panel of the automobile. At this time the latch part 8 of the latch 3 of the protection tube 1 enters into the attachment hole of the panel and the free ends of the latch pieces 13, 14 are each elastically deformed in a direction approaching to each other.

Then, the latch part 8 passes through the attachment hole 8, and the free ends of the latch pieces 13, 14 are each moved in a direction separating from each other by its elastic recovery force. Then, the free ends of the latch pieces 13, 14 moved in the direction separating from each other each abut onto the peripheral edge of the attachment hole and are engaged with the attachment hole.

At this time, the end of the press part 16 abuts onto the panel, latching force of the latch part 8 is enhanced, and the latch part 8 is thus secured to the attachment hole 8. Then, the wire harness 21 including the protection tube with latch 1 is fixed to the panel.

The protection tube with latch 1 related to the above-mentioned first embodiment has the latch 3 to be engaged with the attachment hole of the panel where the electric wire 23 is wired disposed on the outer peripheral face of the protection tube 2 formed tubular and accommodating the electric wire 23.

Therefore, since the protection tube with latch 1 does not require the protection tube 2 to be closely bundled by the latch 3, and is molded integral with the protection tube with latch 1, the protection tube with latch does not experience that the protection tube 2 is collapsed by the latch 3. Therefore, the protection tube 2 archives inherent protection feature for electric wire. Accordingly, various problems induced by the conventional protection tube 2 being collapsed such as the electric wire 23 is bitten by the protection tube 2, load such as vibration exerting to the electric wire 23 is increased, or its appearance is reduced, are resolved.

Furthermore, since the protection tube with latch 1 does not require that the protection tube 2 is closely bundled by the latch 3, omission of work space for handling the bundle tool allows the wiring board to downsize. Usage of the work space for handling the bundle tool as wiring space for the electric wire 23 improves degree of freedom for wiring forms of the electric wire 23 on two-dimensional plane on the wiring board. Furthermore, widening of wiring work space on the wiring board allows wiring work to perform in a direction securing handling the bundle tool without changing the latch 3 or the electric wire 23. This makes the wire harness 21 having the protection tube with latch when wired in three dimensional space of the panel restrained from twist of the electric wire 23.

Furthermore, no need for the protection tube with latch 1 of attachment tool having large and complicated mechanism as conventional one allows small and simple attachment tool to use. This makes wiring space on the wiring board widen.

Furthermore, the protection tube with latch 1 allowing universal protection tube 2 such as available products to be used can more readily correspond to various car types or panel than the conventional protectors that are exclusive. This makes the protection tube with latch 1 cost-reduced.

Furthermore, the protection tube with latch 1 is produced with the manufacturing apparatus 31, and the wire harness is produced that is manufactured with the manufacturing apparatus 31 and is provided with the protection tube with latch 1. This makes large change of manufacturing process of the wire harness eliminate, and thus conventional manufacturing line can manufacture the protection tube with latch 1.

Second Embodiment

Figure 20:
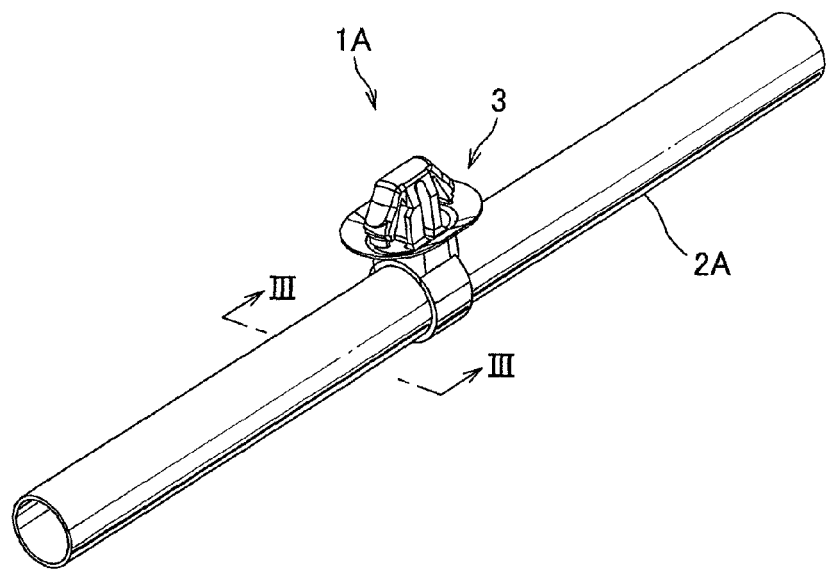
FIG. 20 is a perspective view illustrating a protection tube with latch according to a second embodiment of the invention.
Figure 21:
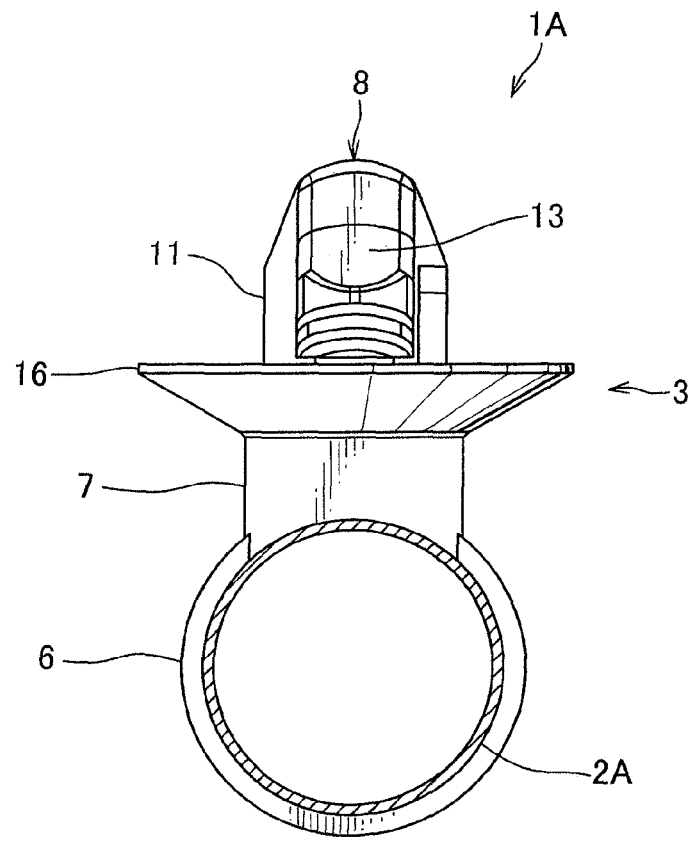
FIG. 21 is a cross-sectional view illustrating the protection tube with latch shown in FIG. 20 taken from arrow III-III.

Next, the second embodiment of a protection tube with latch related to the invention is with reference to FIGS. 20 and 21 discussed. Note that the same parts as the above-mentioned embodiment are provided with the same reference signs and not repeated herein.

The protection tube with latch 1A related to the embodiment, as shown in FIGS. 20 and 21, is provided with a protection tube 2A receiving a not-shown electric wire bundle 22, and a latch 3 formed engageable with the attachment hole of the panel, and on an outer peripheral face of the protection tube with latch 2A the latch 3 is disposed.

The protection tube 2A as shown in FIGS. 20 and 21, is what is called a VE tube of hard vinyl electric wire tube formed into tubular shape, of which an outer peripheral face and an inner peripheral face are formed smooth. The protection tube 2A conforms to fire-retardant of V-0 rank in the UL 94 standards, and is made of synthetic resin such as nylon resin. When on the outer peripheral face of the protection tube with latch 2A the latch 3 is molded by injection-molding a die 60 without weir part is employed.

Note that the protection tube with latch 2A may be tubes formed into various types of tubular shapes such as twist tube in which a single plastic resin sheet is twisted in its peripheral direction and twist starting end and twist terminating end are overlapped to each other, or a braided tube in which resin string is braded into tubular shape. The protection tube 2A may be a generally-used electric wire tube such as synthetic resin plastic electric wire tube. Note that since the braded tube allows melting resin to intrude in a mesh structure during injection molding, the molded latch 3 and the braided tube are further adhered.

The protection tube with latch related to the above-mentioned second embodiment has the latch 3 to be engaged with the attachment hole of the panel in which the electric wire 23 is wired project on the outer peripheral face of the protection tube 2A formed tubular and receiving the electric wire 23. The protection tube 2A is made of hard vinyl electric wire tube.

Thereby, the protection tube with latch 1A related to the second embodiment of the invention, as strength of the protection tube 2A becomes improved significantly, allows its protection feature protecting the electric wire bundle 22 received in the protection tube 2A to improve significantly.

Third Embodiment

Figure 22:
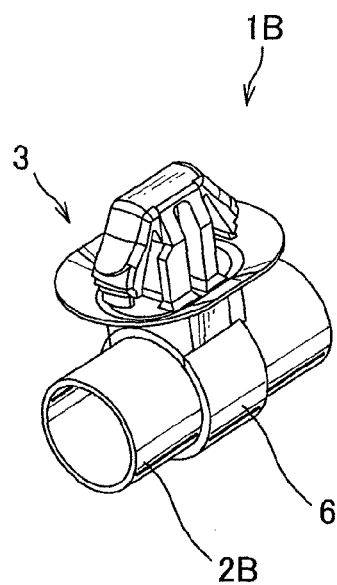
FIG. 22 is a perspective view illustrating a protection tube with latch according to a third embodiment of the invention.
Figure 23:
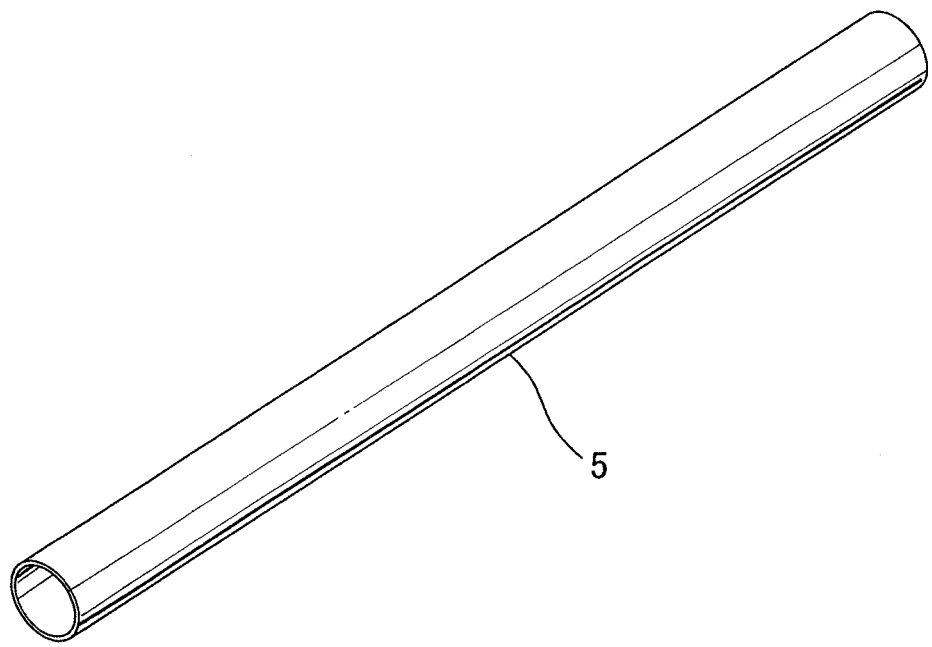
FIG. 23 is a perspective view illustrating a protection tube attached to the protection tube with latch shown in FIG. 22.
Figure 24:
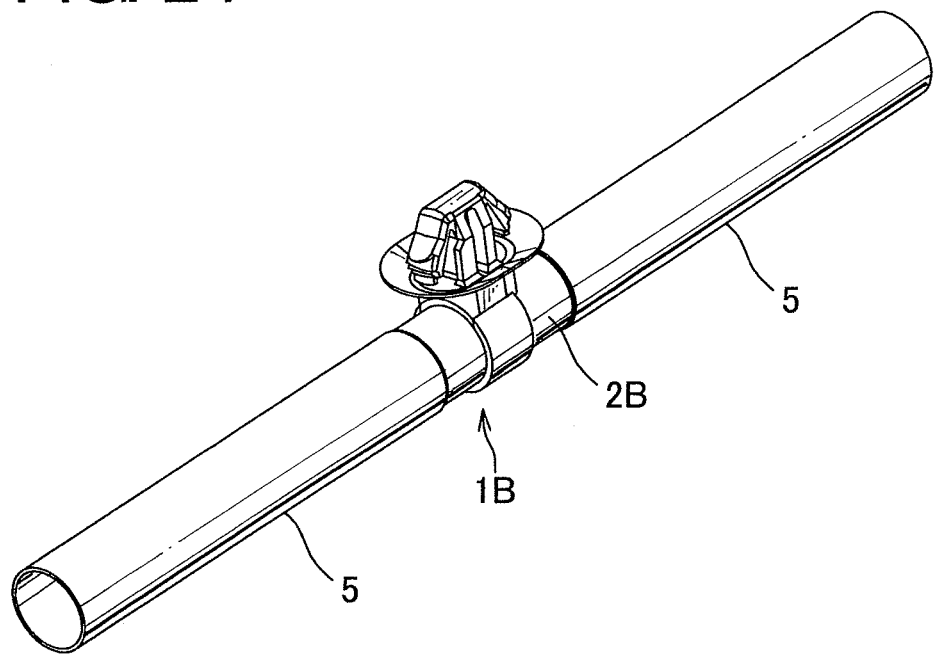
FIG. 24 is a perspective view illustrating a state in which the protection tube shown in FIG. 23 is attached to the protection tube with latch shown in FIG. 22.
Figure 25:
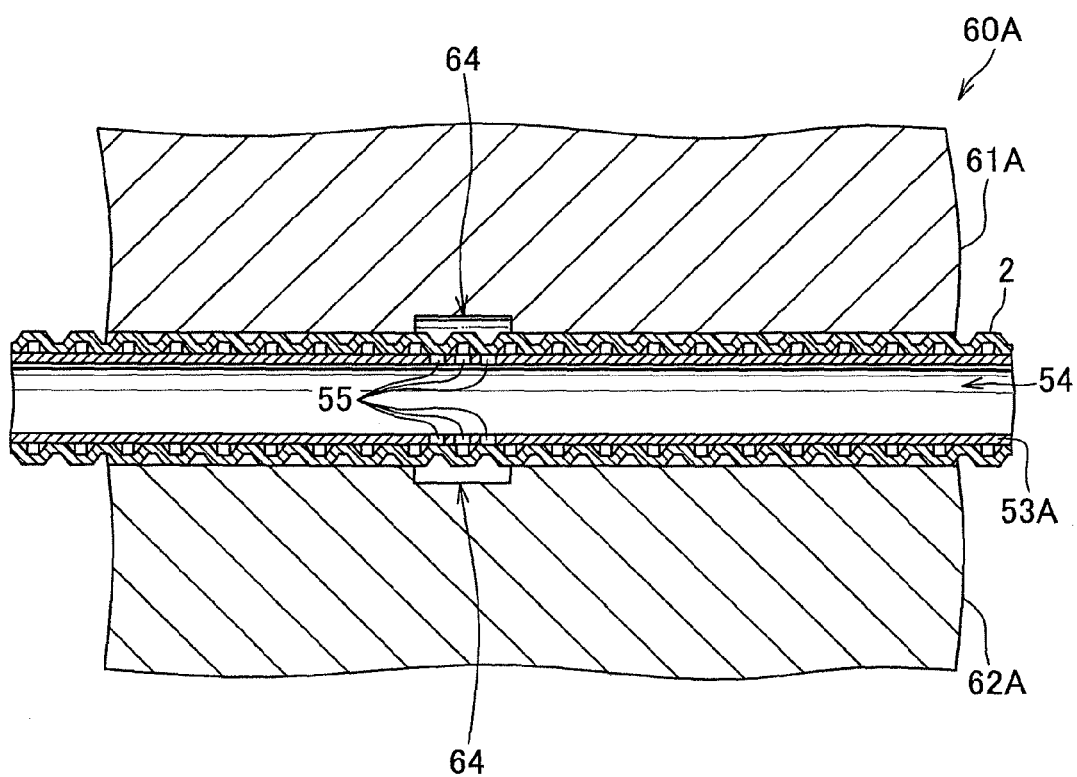
FIG. 25 is a cross-sectional view illustrating a main section of the die and the shaft in a modification in which the die of the injection molding device and the shaft of the positioning tool shown in FIG. 8 are modified.

Next, a third embodiment of a protection tube with latch 1B related to the invention is with reference to FIGS. 22 to 24 is discussed. Note that the same parts as the above-mentioned embodiment are provided with the same reference signs and not repeated herein.

The protection tube with latch 1B related to the embodiment as shown in FIG. 22 is provided with a protection tube 2B receiving a not-shown electric wire bundle 22, and a latch 3 formed engageable with the attachment hole of the panel, and on an outer peripheral face of the protection tube with latch 2B the latch 3 is disposed.

The protection tube 2B as shown in FIG. 22, is what is called a VE tube of hard vinyl electric wire tube formed into tubular shape, of which an outer peripheral face and an inner peripheral face are formed smooth. The protection tube 2B conforms to fire-retardant of V-0 rank in the UL 94 standards, and is made of synthetic resin such as nylon resin. The protection tube 2B is formed such that after the protection tube 2B is, with it elongated, provided with many latches 3 at predetermined intervals, the protection tube 2B is cut at predetermined intervals. When on the outer peripheral face of the protection tube with latch 2B the latch 3 is molded by injection-molding a die 60 without weir part is employed.

Both ends of the protection tube 2B as shown in FIG. 23, is provide with a second protection tube 5 fitted onto the protection tube 2B and fitted into. The second protection tube 5 is formed such that its inner diameter is arranged generally as large as an outer diameter of the protection tube 2B. The second protection tube 5 is what is called a VE tube of hard vinyl electric wire, of which an outer peripheral face and an inner peripheral face are formed smooth. The second protection tube 5 conforms to fire-retardant of V-0 rank in the UL 94 standards, and is made of synthetic resin such as nylon resin.

The protection tube with latch 1B configured as above-mentioned as shown in FIG. 24 is made such that the second protection tube 5 is engaged with both ends of the protection tube 2B and molded integrally, a not-shown electric wire bundle 22 is received in the second protection tube 5 and the protection tube 2B so as to be attached to the panel.

Since the protection tube with latch 1B related to the above-mentioned third embodiment is made such that at both the ends of the protection tube 2B the second protection tube 5 is formed engageable, various types and lengths of protection tubes can be used corresponding to its application or place where it is wired. Thereby, the protection tube with latch 1B has general versatility, can be utilized in a wide area, and can flexibly be manufactured at manufacturing line for the wire harness 21. Since a number of protection tubes with latch 1B are formed of a single protection tube 2B, they can be provided cost-favorably.

Note that the protection tube with latch 1, 1A and 1B related to the first to third embodiments mentioned above as shown in FIG. 25, may be made such that the protection tube 2 is fitted onto a passage 54 formed into hollow tube shape and introduced with pressured air and a shaft 53A provided with a injection outlet 55 injecting the pressured air, the protection tube 2 is sandwiched by the upper die 61A and the lower die 62A each provided with the latch cavity 64, and is blow-molded with the pressured air.

Note that the above-mentioned embodiments merely show typical embodiment of the present invention, but the invention is not limited to the embodiments or the modifications. Namely, it is to be understood that various changes and modifications will be apparent to those skilled in the art. Therefore, unless otherwise such changes and modifications depart from the scope of the present invention hereafter defined, they should be construed as being included therein.

INDUSTRIAL APPLICABILITY

The protection tube with latch according to the invention can be employed for a protector protecting a wire harness to be wired along an attachment hole of a panel in a car body of such an automobile, and a manufacturing apparatus of the protection tube with latch according to the invention is employed for an apparatus of manufacturing the protection tube with latch protecting the wire harness to be wired along the attachment hole of the panel in the car body of such the automobile.

REFERENCE SIGNS LIST 1 protection tube with latch
2 protection tube
2C slit
3 latch
31 manufacturing apparatus
53 shaft
53b projection strip
65, 66 weir
60 die
63 protection tube cavity
64 latch cavity

The invention claimed is:

1. A protection tube apparatus, comprising:
    a latch configured to be engaged with an attachment hole of a panel on which an electric wire is wired; and
    a protection tube formed into tubular shape and accommodating the electric wire therein, the protection tube consisting of a corrugated tube arranged such that a plurality of ridges and grooves are alternately and repeatedly disposed in an axial direction of the protection tube on an outer peripheral face of the protection tube, wherein
    the latch is disposed on the outer peripheral face of the protection tube, and
    the protection tube is longer than the latch in the axial direction of the protection tube, and
    the latch comprises a tubular part, a latch part and a press part, wherein
        the tubular part is disposed about the outer peripheral face of the protection tube,
        the tubular part comprises a plurality of circular projecting strips disposed in the axial direction of the protection tube so as to be fitted into the plurality of grooves,
        the latch part is configured to retain engagement of the latch with the attachment hole,
        the press part comprises a taper-like shape, such that its diameter is enlarged as it extends away from the outer peripheral face of the protection tube, and is formed to have some elasticity, and
        an end of the press part presses a surface of the panel when the latch part is engaged with the attachment hole of the panel.

2. The protection tube apparatus as claimed in claim 1, wherein the corrugated tube is provided across its whole length with a slit, wherein
    the latch is provided with a tubular part disposed on the outer peripheral face of the protection tube and formed into cylindrical shape, and
    the tubular part is provided with a slit continually communicating with the slit of the corrugated tube.

3. The protection tube apparatus as claimed in claim 1, wherein the latch part further comprises a columnar part and a first latching piece extending obliquely from the columnar part, the first latching piece configured to retain engagement of the latch with the attachment hole, and the columnar part of the latch protrudes radially from the outer peripheral face of the protection tube.

4. The protection tube apparatus as claimed in claim 3, wherein the latch part further comprises a second latching piece on an opposed side of the columnar part from the first latching piece, the second latching piece extending obliquely from the columnar part.

5. The protection tube apparatus as claimed in claim 4, wherein the first latching piece and the second latching piece are elastically deformable in a direction approaching each other.

6. The protection tube apparatus as claimed in claim 1, wherein the latch is configured to be engageable to the attachment hole of the panel with the protection tube axially aligned with the electric wire.

7. The protection tube apparatus as claimed in claim 1, wherein the latch part further comprises:
    a columnar part;
    a first latching piece extending obliquely from the columnar part; and
    a second latching piece on an opposed side of the columnar part from the first latching piece, the second latching piece extending obliquely from the columnar part,
    wherein the first latching piece and the second latching piece are configured to retain engagement of the latch with the attachment hole, and
    wherein the columnar part, the first latching piece, and the second latching piece are aligned in an axial direction of the protection tube.

* * * * *